United States Patent [19]
August, Jr. et al.

[11] Patent Number: 5,317,590
[45] Date of Patent: May 31, 1994

[54] POSITIONING, COMPRESSION AND STORAGE DEVICE FOR A MODULAR FACE-PUMPED LASER

[75] Inventors: John L. August, Jr., Schenectady; Mark J. Kukla, Ballston Spa, both of N.Y.

[73] Assignee: General Electric Company, Schenectady, N.Y.

[21] Appl. No.: 952,080

[22] Filed: Sep. 28, 1992

[51] Int. Cl.⁵ .............................................. H01S 3/00
[52] U.S. Cl. ...................................... 372/109; 372/70
[58] Field of Search .................. 372/39, 40, 41, 66, 372/69, 70, 107, 108, 109

[56] References Cited

U.S. PATENT DOCUMENTS 3,978,427  8/1976  Truscott ........................... 372/40 X
4,378,601  3/1983  Eggleston, III et al. .......... 372/70 X
4,653,061  3/1987  Fukae .............................. 372/107 X
4,899,347  2/1990  Kuchar et al. ..................... 372/39
4,972,426  11/1990 Steffen ............................. 372/66
4,993,041  2/1991  Sidler et al. .................... 372/109 X Primary Examiner—Brian Healy
Attorney, Agent, or Firm—James R. McDaniel; Paul R. Webb, II

[57] ABSTRACT

This invention relates to a positioning, compression and storage device for modular face-pumped slab laser heads of the type that are constructed of individual components, which are rigidly attached together, in order to form an integral structure. Such structures of this type, generally, allow face-pumped slab laser head components to be assembled and stored easily and quickly.

3 Claims, 3 Drawing Sheets

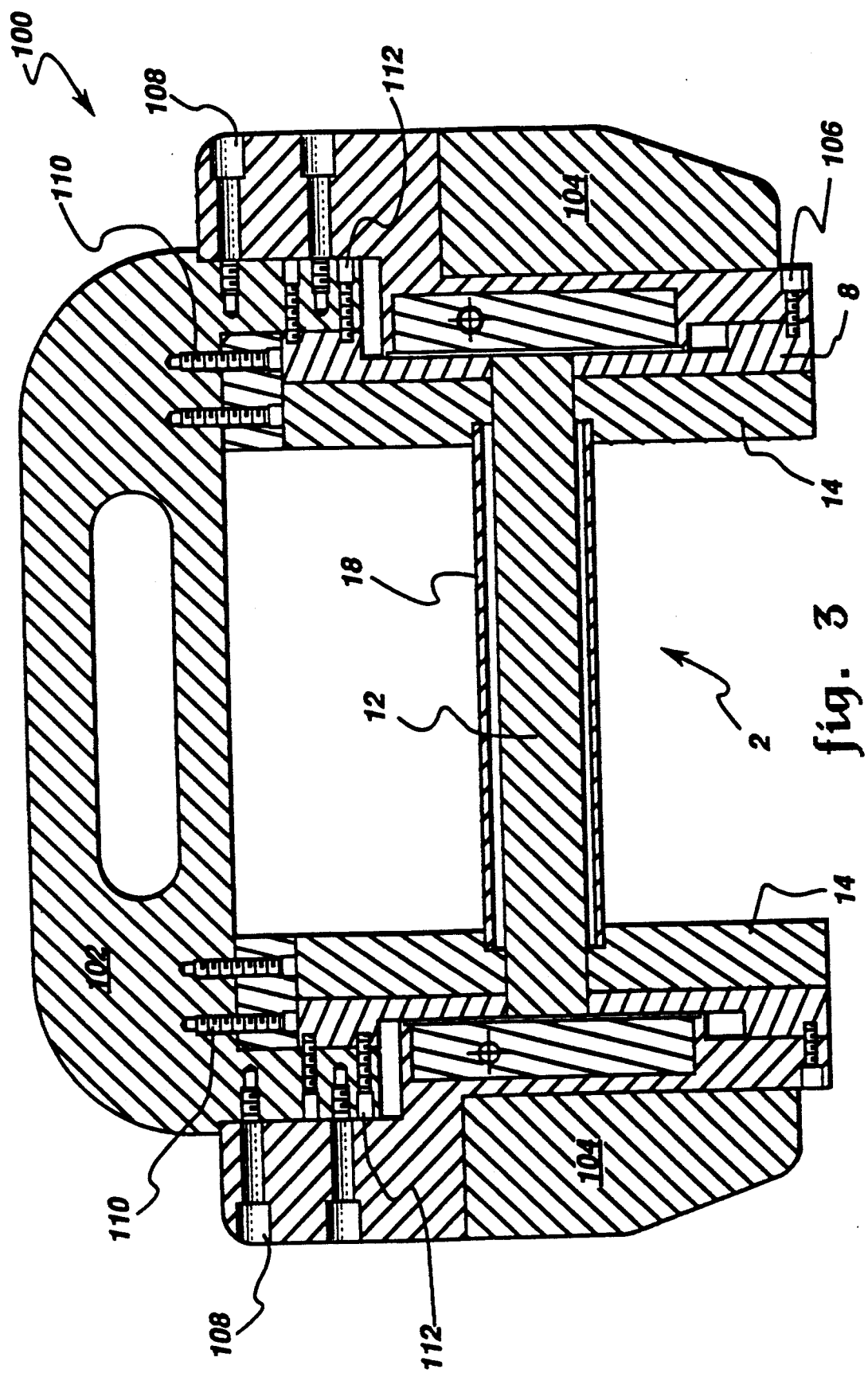

POSITIONING, COMPRESSION AND STORAGE DEVICE FOR A MODULAR FACE-PUMPED LASER

BACKGROUND OF THE INVENTION

1. Field of the Invention

This invention relates to a positioning, compression and storage device for modular face-pumped slab laser heads of the type that are constructed of individual components, which are rigidly attached together, in order to form an integral structure. Such structures of this type, generally, allow face-pumped slab laser head components to be assembled and stored easily and quickly.

2. Description of the Related Art

Up to the present invention, complete dismantling of a face-pumped slab laser head is required in order to repair, replace or service a face-pumped laser. The complete dismantling typically requires a total optical alignment to properly restore the laser performance. A typical "down time" for a face-pumped slab laser which usually involves complete dismantling, re-assembly and realignment is about two days. Obviously, such a lengthy "down time" is expensive and time consuming. Therefore, a new advantageous system, therefore, would be presented if such amounts of "down time" could be reduced.

It is known, in commercial rod lasers, to utilize a rod, an end cap, and a flow tube replacement assembly to reduce "down time". While this replacement assembly performs adequately for a rod laser, a face-pumped slab laser head requires a far more complex replacement or modular assembly, such as, for example, the cooling integration and cooling passage design. Also, the optical alignment requirements of a rod laser are not as stringent as those of a face-pumped slab laser. Therefore, modular slab laser assembly which reduced "down time" would be advantageous.

Finally, when a slab laser head is assembled, it is necessary to precisely align the constituent parts. However, the act of constructing the constituent parts assembly and moving the completed assembly compromises the precision of this alignment since these parts are easily moved out of alignment. Therefore, a still further advantageous system would be presented if the modular slab laser could be constructed easily and quickly and was capable of being moved without disrupting the alignment precision of the laser.

It is apparent from the above that there exists a need in the art for a positioning, compression and storage device for a modular face-pumped laser system which is capable of positioning the components of the laser head and which at least retains the components in their assembled position, but which at the same time is capable of being moved without disrupting the alignment precision of the laser system. It is a purpose of this invention to fulfill this and other needs in the art in a manner more apparent to the skilled artisan once given the following disclosure.

SUMMARY OF THE INVENTION

Generally speaking, this invention fulfills these needs by providing a positioning, compression and storage device for a modular face-pumped laser head which comprises, a modular slab laser assembly and a handle means operatively connected to said modular slab laser head assembly.

In a preferred embodiment, handle means are constructed of aluminum. Also, a flange means is operatively connected to the modular slab laser assembly and the handle.

In another further preferred embodiment, the positioning, compression and storage device, provides alignment positioning for the modular slab laser assembly. Also, the device keeps the various components of the modular slab laser assembly in alignment. Finally, the device allows the modular slab laser assembly to be stored without adversely affecting the alignment of the assembly.

The preferred positioning, compression and storage device for a modular face-pumped slab laser head, according to this invention, offers the following advantages: ease of assembly of the laser components; excellent laser component alignment retention characteristics; good stability; good durability; excellent slab and optical alignment; good economy; excellent laser storage characteristics and high strength for safety. In fact, in many of the preferred embodiments, these factors of component alignment retention, storage, and slab and optical alignment are optimized to an extent that is considerably higher than heretofore achieved in prior, known laser heads.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which:

FIG. 3 is a side plan view of an assembled positioning, compression and storage device.

DETAILED DESCRIPTION OF THE INVENTION

Figure 1:
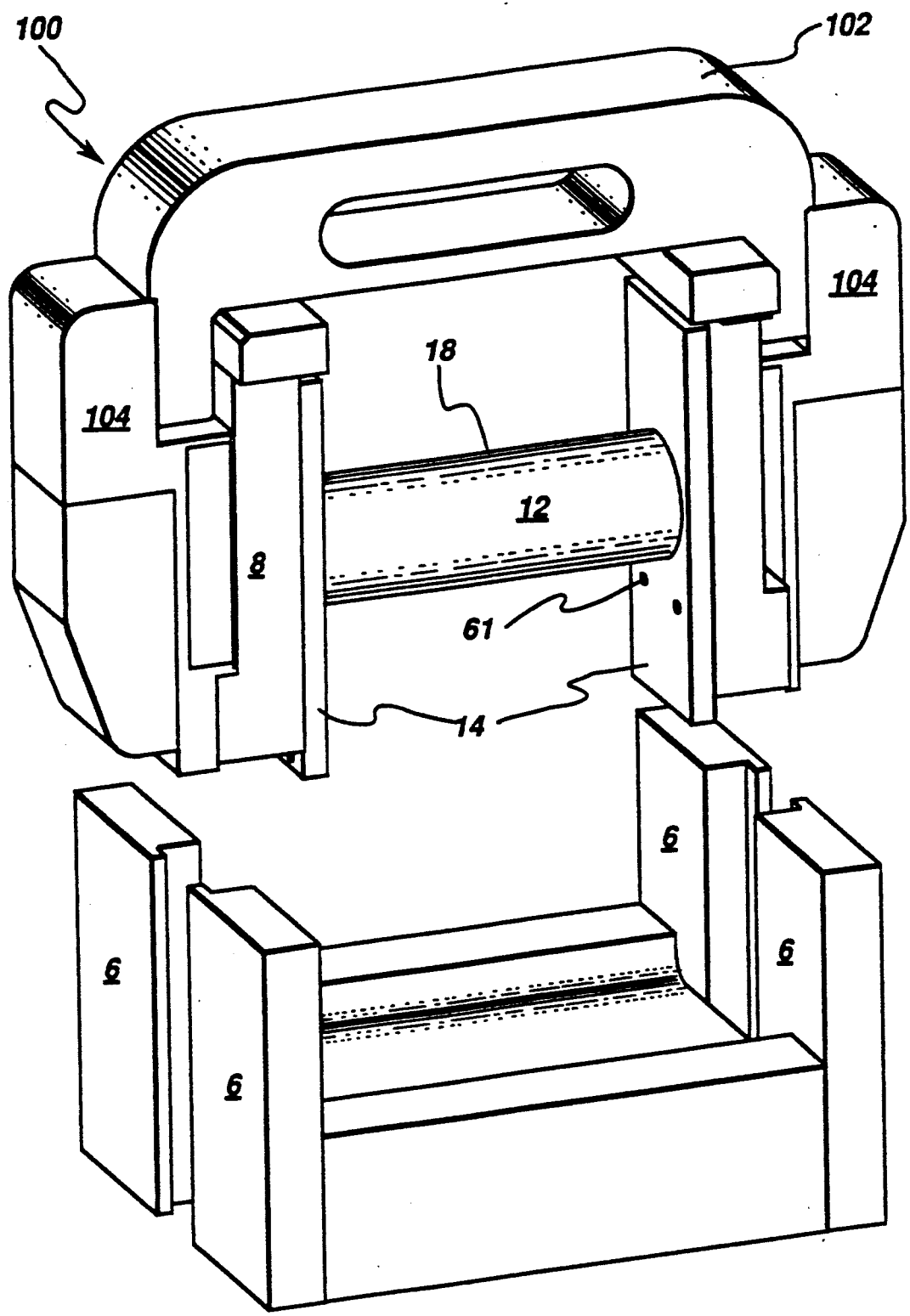
FIG. 1 is an isometric view of a modular slab laser with a positioning, compression and storage device attached, according to the present invention.
Figure 2:
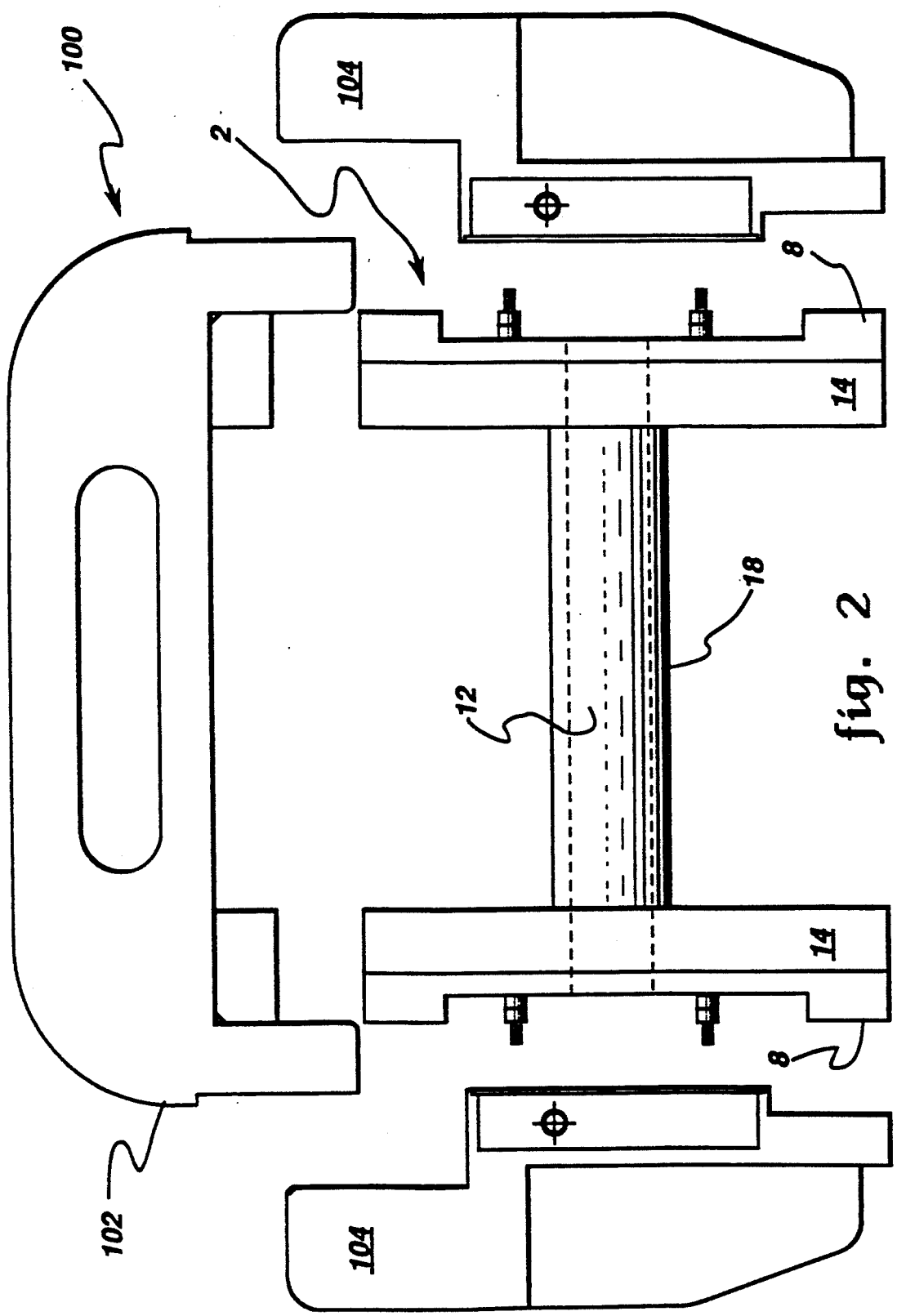
FIG. 2 is an exploded side plan view of the positioning, compression and storage device, according to the present invention.

With respect to FIG. 1, there is illustrated positioning, compression and storage device 100. Device 100 is rigidly secured to outer end caps 8. In particular, as can be more clearly shown in FIGS. 2 and 3, assembly 100 includes, in part, handle 102 and compression flanges 104. Handle 102 and flanges 104, preferably, are constructed of aluminum. As shown more clearly in FIG. 3, handle 102 is placed over modular face-pumped laser head 2 and rigidly attached to outer end cap 8 of laser head 2 by conventional fasteners 112. Handle 102 is also rigidly attached to outer end cap 8 and inner end cap 14 of laser head 2 by conventional fasteners 110. Compression flanges 104 are rigidly attached to outer end cap 8 by conventional fasteners 106. Also, flanges 104 are rigidly attached to handle 102 by conventional fasteners 108.

It is to be understood that because compression assembly 100 is attached to outer end caps 8 compression assembly 100 and laser head 2 can be stored. In this manner, if a defect occurs in slab 12 in laser assembly 2 due to, for example, a contamination or fracture of slab 12, the operator merely has to remove compression assembly 100 from slab laser head 2 and replace the defective compression assembly 100 with a new compression assembly 100. The defective compression assembly 100 can then be repaired. It is to be understood that compression assembly 100 allows outer end caps 8 and 14 to be rigidly held in place while providing proper alignment for slab 12. This allows compression assembly 100 to be placed in a proper storage area so that it can be used later if by chance the compression assembly 100 that is currently being used in laser head 2 fails.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A positioning, compression and storage device for a modular face-pumped laser head which is comprised of:
   a modular slab laser assembly having a slab; and
   a handle means operatively connected to said slab such that said slab can be removed from said modular slab laser assembly and stored.

2. The device, as in claim 1, wherein said device is further comprised of:
   a flange means operatively connected to said handle means and said slab laser assembly.

3. The device, as in claim 2, wherein said flange means is further comprised of:
   at least two compression flanges.

* * * * *